United States Patent [19]

Sakaguchi et al.

[11] Patent Number: 5,313,344

[45] Date of Patent: May 17, 1994

[54] STAND-BY MODE SETTING/RELEASING DEVICE FOR VIDEO CASSETTE RECORDER

[75] Inventors: Hiroshi Sakaguchi, Amagasaki; Sigekazu Morikawa, Tondabayashi, both of Japan

[73] Assignee: Sanyo Electric Co., Ltd., Osaka, Japan

[21] Appl. No.: 15,053

[22] Filed: Feb. 8, 1993

Related U.S. Application Data

[63] Continuation of Ser. No. 707,976, May 23, 1991, abandoned, which is a continuation of Ser. No. 343,717, Apr. 27, 1989, abandoned.

[30] Foreign Application Priority Data

Apr. 28, 1988 [JP] Japan .................................. 63-106834

[51] Int. Cl.$^5$ ............................................. G11B 15/18
[52] U.S. Cl. .................... 360/71; 360/74.100; 360/69
[58] Field of Search ................ 360/69, 75, 81, 84, 360/70, 71, 74.3, 78.01, 78.02, 80, 10.3, 72.2, 74.1, 73.05; 358/310, 906

[56] References Cited

U.S. PATENT DOCUMENTS

| | | | |
|---|---|---|---|
| 3,869,709 | 3/1975 | Yamagishi et al. | 360/10.3 |
| 4,161,002 | 7/1979 | Saito | 360/75 |
| 4,530,038 | 7/1985 | Narita | 360/10.3 X |
| 4,631,605 | 12/1986 | O'Gwynn | 360/73.04 X |
| 4,701,821 | 10/1987 | Muller | 360/84 X |
| 4,717,968 | 1/1988 | Painton et al. | 358/310 |
| 4,737,867 | 4/1988 | Ishikawa et al. | 360/75 X |
| 4,841,388 | 6/1989 | Hori | 360/74.1 X |
| 4,982,305 | 1/1991 | Asano et al. | 360/72.2 |
| 5,101,311 | 3/1992 | Richmond | 360/69 |

FOREIGN PATENT DOCUMENTS

3334885A1  3/1984  Fed. Rep. of Germany.

OTHER PUBLICATIONS

Japanese Patent Abstract Publication No. 63-311649, vol. 13, No. 149, (P-855), Apr. 12, 1989, Kanda Hideaki, "Drum Drive Control System".

Japanese Patent Abstract Publication No. 59-45648, vol. 8, No. 147, (P-285) (1584), Jul. 10, 1984, Jul. 10, 1984, Shiyuuichi Narita, "Recording and Reproducing Device".

"Television Technology", issued by Denshi Shuppan K.K., pp. 44 to 49, Sep. 1987, issue.

Primary Examiner—Andrew L. Sniezek
Attorney, Agent, or Firm—Nikaido, Marmelstein, Murray & Oram

[57] ABSTRACT

A stand-by mode setting/releasing device is provided for a video cassette recorder (VCR). When the attachment of the video cassette to a video cassette recorder (VCR) is terminated, a microcomputer drives a cylinder motor immediately to execute tape loading. In the stop state, with the tape loading completed, cylinder rotation is continued for 5 minutes without tensioning the tape and cylinder rotation is terminated after a lapse of the 5 minutes. In this manner, other modes in the stop mode can be set quickly, while power consumption is also avoided. When there is no necessity of maintaining channel selection at the VCR tuner, tape loading and power turn-off may be executed after a lapse of the five-minute period to further reduce the power consumption.

6 Claims, 7 Drawing Sheets

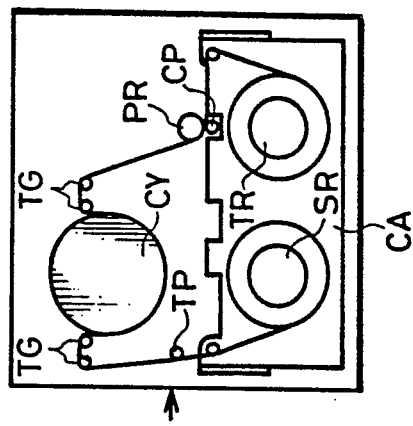
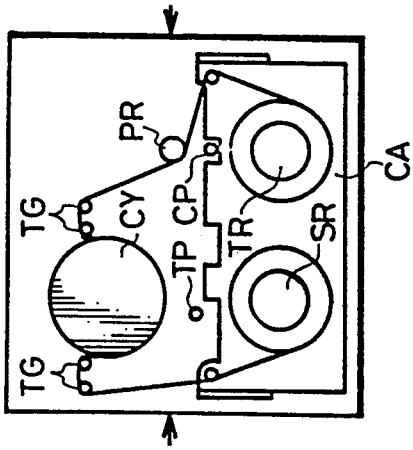
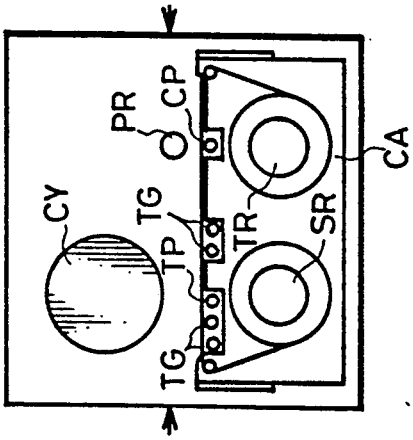
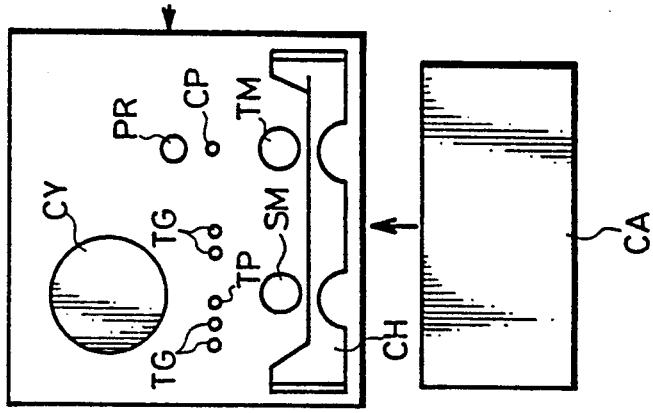

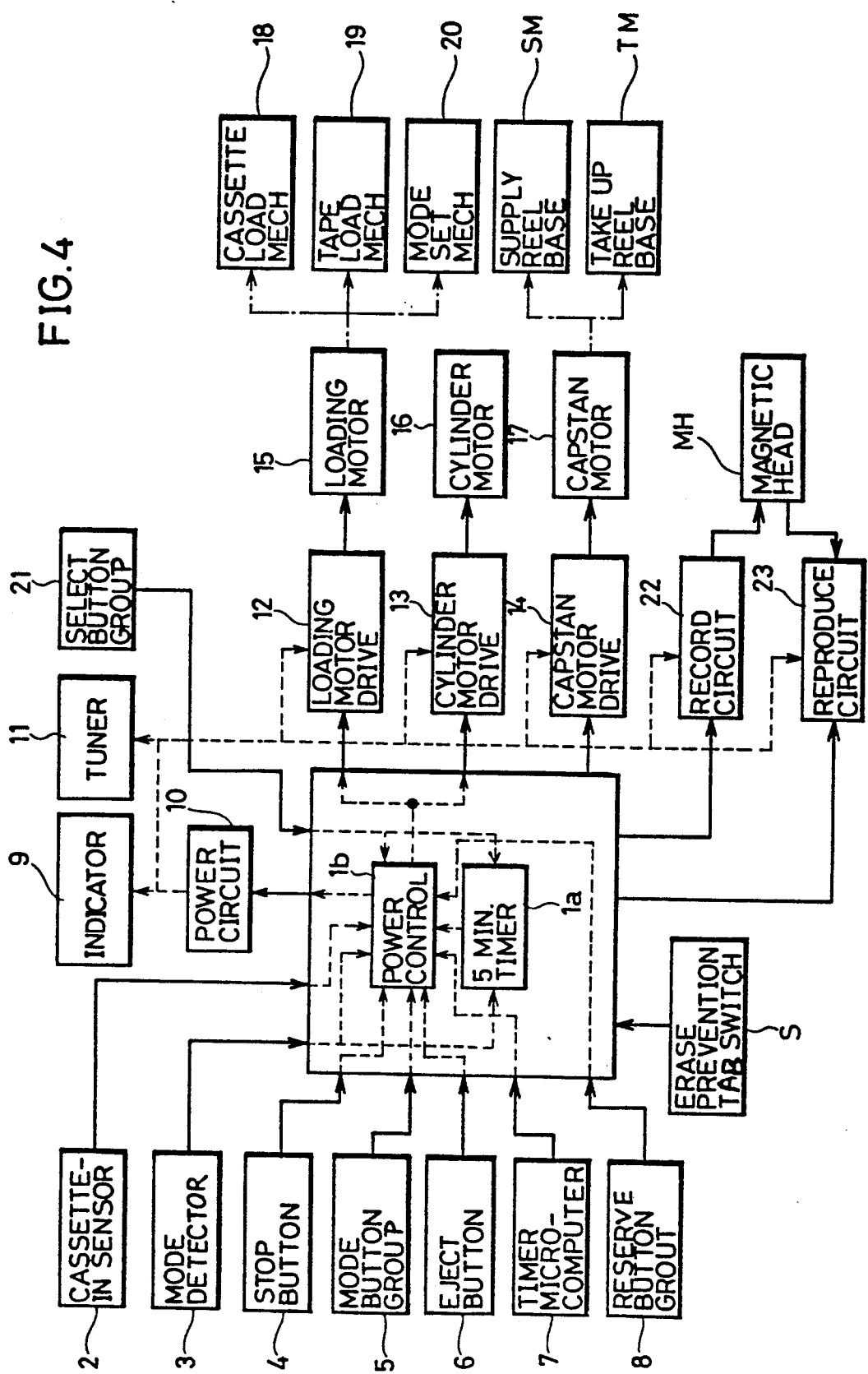

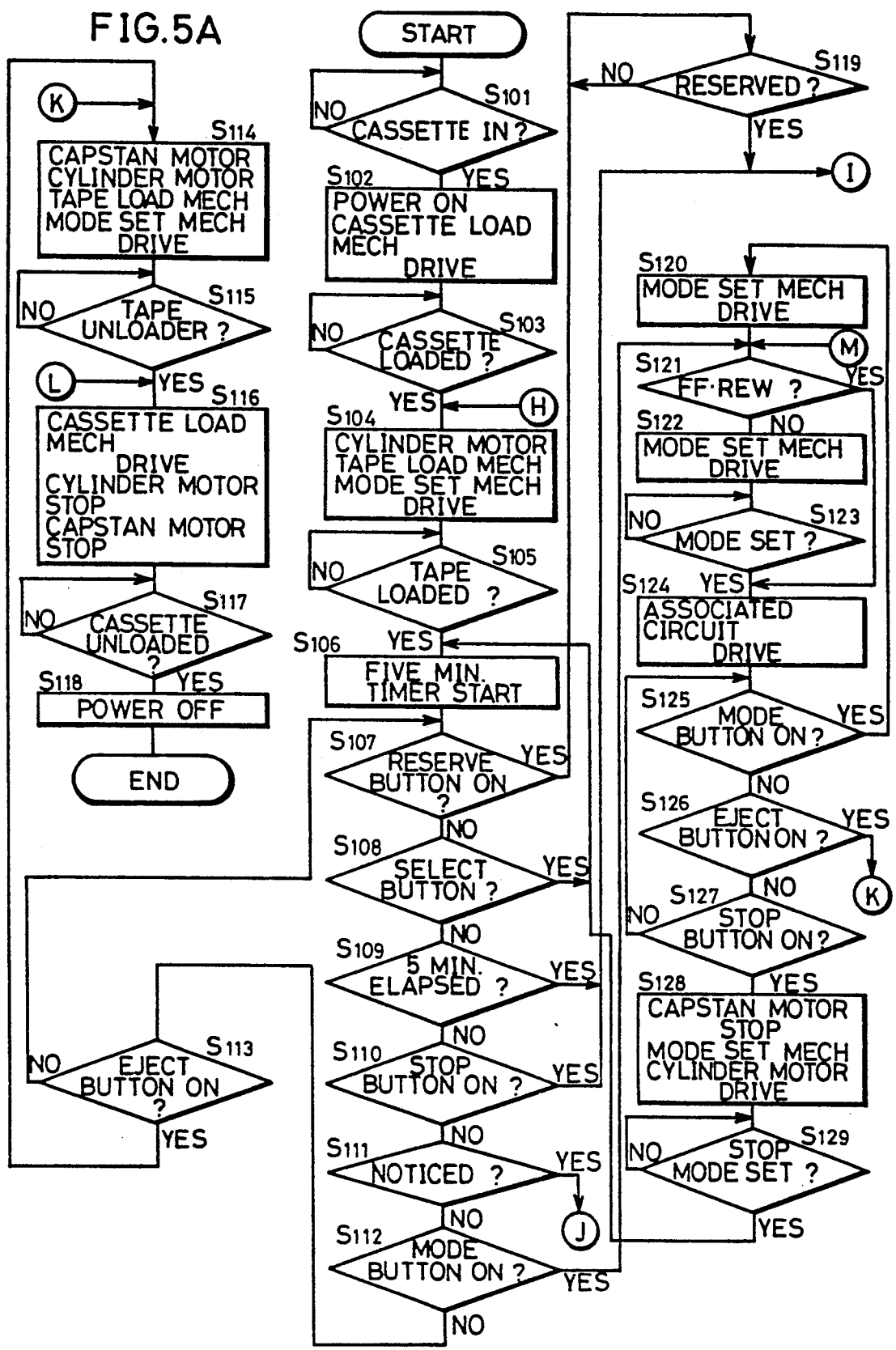

STAND-BY MODE SETTING/RELEASING DEVICE FOR VIDEO CASSETTE RECORDER

This application is a continuation of application Ser. No. 707,976 filed on May 23, 1991 which is continuation of originally filed application Ser. No. 343,717 filed on Apr. 27, 1989 both now abandoned.

BACKGROUND OF THE INVENTION

1. Field of the Invention

This invention relates to a stand-by mode setting and releasing device for a video cassette recorder (referred to hereinafter as VCR). More particularly, it relates to a) a stand-by mode setting and releasing device whereby cylinder rotation may be continued for a predetermined time period in the stop mode after completion of a tape loading operation performed responsive to attachment of a video cassette, and b) a VCR provided with such a setting and releasing device.

2. Description of Prior Art

Conventionally, in the VHS type VCR, the tape is not extracted from the cassette in the stop mode following attachment of the video cassette to the VCR, and it is maintained in the tape unloading state. In such a stop mode, when the play mode or the record mode is set, the cylinder is first driven into rotation for tape loading. Then, a reel and capstan are driven into operation, a pinch roller is brought into pressure contact with the capstan, while tension is applied to the tape. In the conventional VCR, a time interval of about 4.5 seconds is involved since the instructions for setting the play mode until start of reproduction, for the above series of operations, so that it has been an incumbent task to reduce the time involved in the mode setting.

There is thus proposed a VCR in which tape loading is executed immediately on loading the video cassette to the VCR in operative association therewith and a stop mode is set upon termination of the tape loading. In such a VCR, the time involved since the instructions of setting of the play mode until start of reproduction is reduced to about 3.2 seconds., while it becomes possible to perform fast forward or rewind operations as well as quick location of the beginning of a program while the tape is in the loaded state. Such a VCR is disclosed for example in a periodical entitled "Television Technology", issued by Denshi Shuppan KK, pages 44 to 49, September issue, 1987.

However, in the VHS type VCR, an upper cylinder fitted with the magnetic head is driven into rotation during operation, and it takes a lot of time until the rotational speed of the head reaches a predetermined rotational speed. Consequently, in such a VCR, it takes some time until a mode specified during the stop mode is started, so that it has been difficult to set some other mode quickly at the stop mode.

SUMMARY OF THE INVENTION

It is an object of the present invention to provide a stand-by mode setting and releasing device for a video cassette recorder wherein some other mode may be set quickly during the stop mode following the completion of tape loading.

It is another object of the present invention to provide a stand-by mode setting and releasing device wherein some other mode than the stop mode may be set quickly at the stop mode of the VCR without wasteful power consumption.

It is still another object of the present invention to provide a video cassette recorder wherein some other mode than the stop mode may be set quickly without wasteful power consumption at the stop mode following the completion of tape loading which is performed in association with the attachment of the video cassette.

Stated briefly, this invention provides a stand-by mode setting and releasing device for a video cassette recorder, wherein tape loading is performed immediately responsive to termination of attachment of the video cassette by the cassette loading mechanism, a stand-by mode of continuously driving the cylinder motor is executed during the stop mode following termination of tape loading, and wherein, after lapse of a certain period of time, the operation of the cylinder motor is stopped to release the stand-by mode.

In another aspect of the present invention, the stand-by mode setting and releasing device for the video cassette recorder is so designed that a stand-by mode is executed in the stop mode following termination of tape loading, a tape unloading is executed and the power source is turned off to release the stand-by mode after lapse of a predetermined time.

In a still another aspect of the present invention, the stand-by mode setting and releasing device for the video cassette recorder is so designed that the timing for a predetermined time interval is reset when a channel selecting operation is performed during execution of the stand-by mode.

In still another aspect of the present invention, the stand-by mode setting and releasing device for the video cassette recorder is so designed that, when a stop mode is designated during execution of the stand-by mode, tape unloading is executed, the power source is turned off to release the stand-by mode, and, when the stop mode is again designated, the power source is turned off, while tape loading is performed to return to the stand-by mode.

Consequently, it is a principal advantage of the present invention that, by executing the stand-by mode of continuously driving the cylinder motor without imparting tension to the tape during the stop mode following tape loading, it becomes possible to set other modes quickly.

It is another advantage of the present invention that the wasteful power consumption may be avoided by stopping the driving of the cylinder motor after lapse of a predetermined time following tape loading to release the stand-by mode.

It is still another advantage of the present invention that the wasteful power consumption may be further reduced by executing tape unloading and turning off the power source to release the stand-by mode after lapse of a predetermined time following tape loading.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 1A-1D are plan views diagrammatically showing the state of each mode of the VCR to which the present invention is applied.

FIG. 4 is a diagrammatic block view showing a second embodiment of the present invention.

FIGS. 5A and 5B are flow charts for illustrating the operation of the second embodiment of the present invention.

DESCRIPTION OF THE PREFERRED EMBODIMENTS

FIG. 1 is a plan view diagrammatically showing the status of each mode of the VCR to which the present invention is applied.

Referring first to FIG. 1, the principle of the first embodiment of the present invention will be explained diagrammatically. In sum, this first embodiment is so designed that the cylinder motor operation is continued after setting the stop mode and, unless a mode changing operation is performed within five minutes since the setting of the stop mode is sensed, the driving of the cylinder motor is terminated.

Referring to FIG. 1, status (A) indicates the cassette unload state, status (B) indicates the cassette load or tape unload state, status (C) indicates the tape load state, and status (D) shows the constant speed running state for recording and/or reproduction.

First, in status (A), when a video cassette (CA) is inserted into a cassette holder (CH), cassette loading is achieved, and status (B) is reached. In this status (B), a supply reel SR and a take-up reel TR for cassette CA are fitted to a supply reel base SM and a take-up reel base TM respectively, while a pair of tape guides TG, a tension pin TP and a capstan CP are intruded into recesses formed at the forward side of the cassette CA.

When status (B) is reached, the upper cylinder CY is immediately driven into rotation and the tape guides TG are moved to extract the tape from the cassette CA. The extracted tape is wound about the rotating cylinder CY and status (C) is reached. The feature of this first embodiment is that the cylinder rotation is continued for five minutes in status (C) so that the stand-by mode is executed. When a fast forward or rewind operation is performed in status (C), the capstan motor is driven into rotation to drive the take up reel TR or supply reel SR at an elevated speed.

In status (C), when a play or record operation is performed, the capstan CP is driven into rotation, while a pinch roller PR is brought into pressure contact with this capstan CP, while a tension pin TP is brought into abutment with the tape, so that status (D) is reached.

These modes are terminated when the reel base is braked by the stop operation to return to the above described status (C). At the time of and shortly after the setting of the stop mode in status (C), the cylinder CY is maintained in the rotating state (stand-by mode), and the rotation is discontinued in five-minutes. When a stop operation is performed in the stop mode of status (C), the status (B) is again reached and the power source is turned off. In any of the statuses (B), (C) and (D), an eject operation results in cassette unloading and status (A) is again reached.

Figure 2:
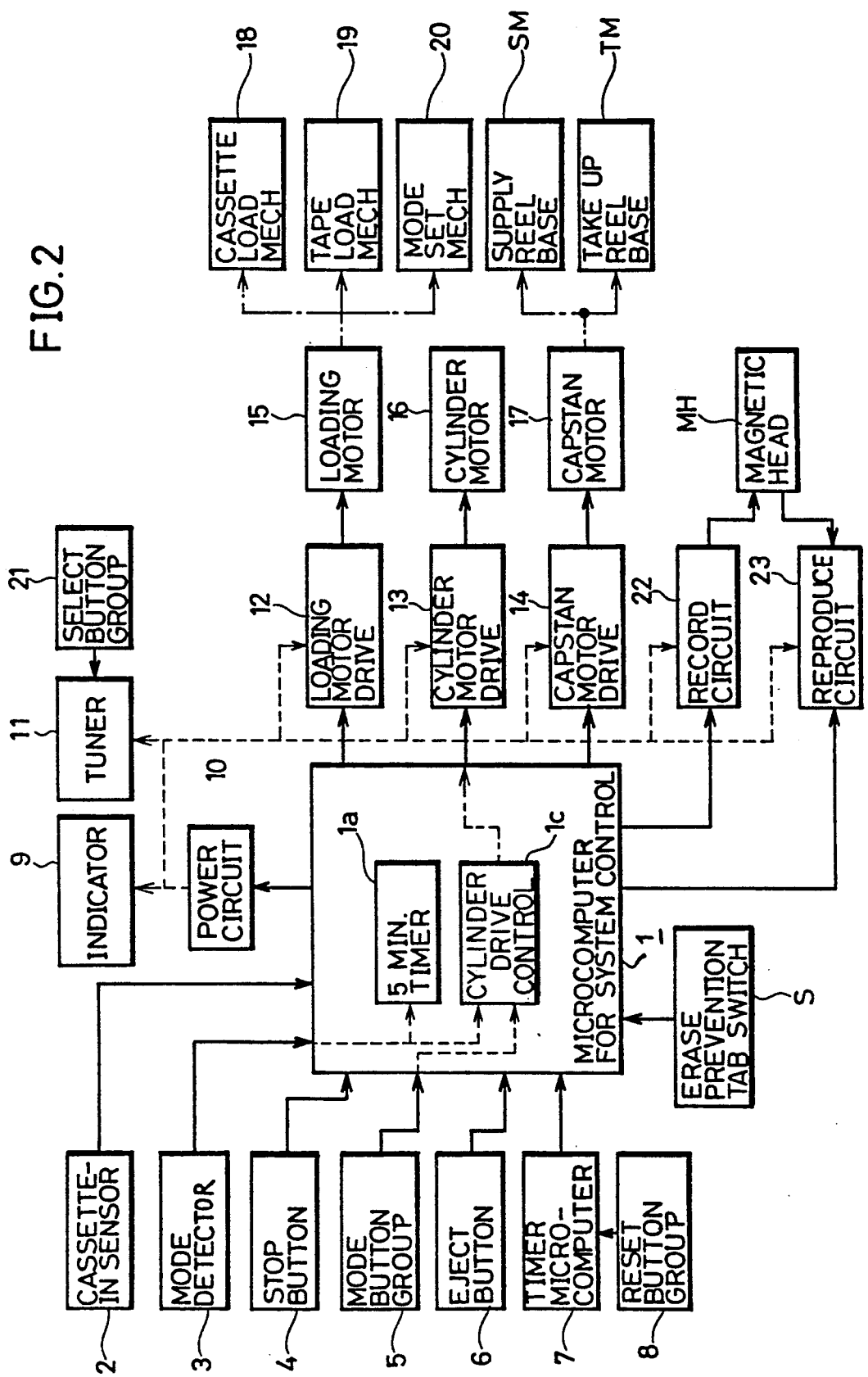
FIG. 2 is a diagrammatic block view showing a first embodiment of the present invention.

FIG. 2 is a diagrammatic block view showing an arrangement for realizing the above described first embodiment by a microcomputer. Referring to FIG. 2, a microcomputer 1 for system control includes a five-minute timer 1a for computing the five-minute stand-by time in a stop mode and outputting a time-up output, and a cylinder driving control circuit 1c.

The microcomputer 1 is connected at its inputs to a cassette-in sensor 2, a mode detector 3, a stop button 4, a group of mode setting buttons 5, an eject button 6, a timer microcomputer 7, and an erase prevention tab switch S, while being connected at its outputs to a power source circuit 10, a loading motor driving circuit 12, a cylinder motor driving circuit 13, a capstan motor driving circuit 14, a recording circuit 22 and a reproducing circuit 23.

The cassette-in sensor 2 senses mechanically that the video cassette CA is intruded into the cassette holder CH in status (A) of FIG. 1, and issues an output to the microcomputer 1. The mode detector 3 detects the movement of a mode setting mechanisms 20 composed of all of the mechanical portions of the tape running system except the loading mechanism and decides which of the statuses (A) to (D) of FIG. 1 is assumed by the VCR to supply the decision output to the five-minute timer 1a and the cylinder driving control circuit 1c of the microcomputer 1. This mode detector 3 may for example be a decoder for detecting the rotational position of particular cam of the tape running mechanism. The stop button 4 functions not only as the stop mode setting button but as a power source button. The group of mode setting button 5 is comprised of various mode setting buttons, such as fast forward button, rewind button, playback button and record button and is connected to the cylinder driving control circuit 1c. The eject button 6 is an eject operating button that may be operated in any of the statuses (B), (C) and (D) of FIG. 1. The timer microcomputer 7 is designed to store the information of reservation by the operation of the reservation button group 8, issues a reservation output when the reservation information is stored, issues an advanced notice output ten and several seconds before the reservation time, issues a start output at the reservation time point and issues a termination output at the end time point. The erase prevention tab switch S senses that the erase prevention tab of the cassette CA is not broken at the time of completion of cassette attachment, and issues a corresponding detection output to the microcomputer 1.

The power source circuit 10 is controlled by the microcomputer 1 and, in the power-on state, supplies power to an indicator 9, a tuner 11 driven by a channel select button group 21, a loading motor driving circuit 12, a cylinder motor driving circuit 13, a capstan motor driving circuit 14, a recording circuit 22 and a reproducing circuit 23 to enable the driving of these circuits. It is noted that, in the embodiment of FIG. 2, the timer microcomputer 7, the microcomputer 1 for system control and some of the display means, not shown, are driven by a separate power source circuit, not shown, which is perpetually in the driven state.

The loading motor driving circuit 12 drives the loading motor 15 responsive to the output from the microcomputer 1. This loading motor 15 is operatively connected to the aforementioned mode setting mechanism 20, while being alternatively connected to one of the cassette loading mechanism 18 and the tape loading mechanism 19. The cylinder motor driving circuit 13 includes a cylinder servo and, responsive to the output from the microcomputer 1, drives the cylinder motor 16 adapted for rotationally driving the upper cylinder CY. The capstan motor driving circuit 14 includes a capstan servo and, responsive to the output from the microcomputer 1, drives the capstan motor 17. This capstan motor 17 drives the capstan CP, while alternatively driving one of the supply reel base SM and the take-up reel base TM responsive to the mode setting. Above all, the cylinder driving control circuit 1c in the microcomputer 1 drives the cylinder motor driving circuit 13 in each of the tape loading period, tape unloading period and the period of setting of various modes, based on the operation of the mode setting button group 5 and the detection output of the mode detector 3, while also driving the cylinder motor driving circuit 13, even during the stand-by mode since the setting of the stop mode until the issuance of the time-up output of the five-minute timer 1a. The recording circuit 22 and the reproducing circuit 23 are connected to a magnetic head MH attached to a cylinder CY (FIG. 1).

Figure 3A:
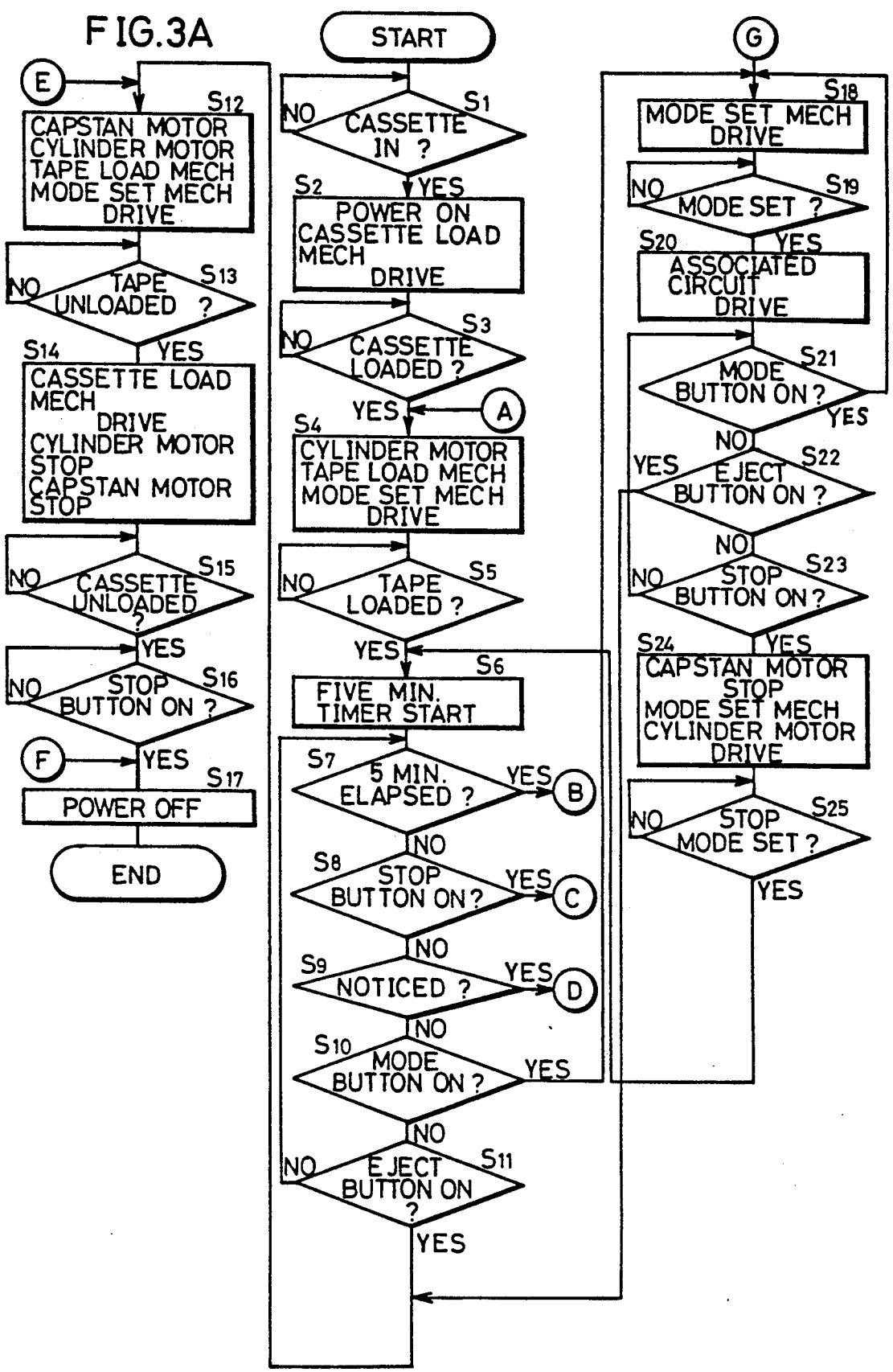
FIGS. 3A and 3B are flow charts for illustrating the operation of the first embodiment of the present invention.
Figure 3B:
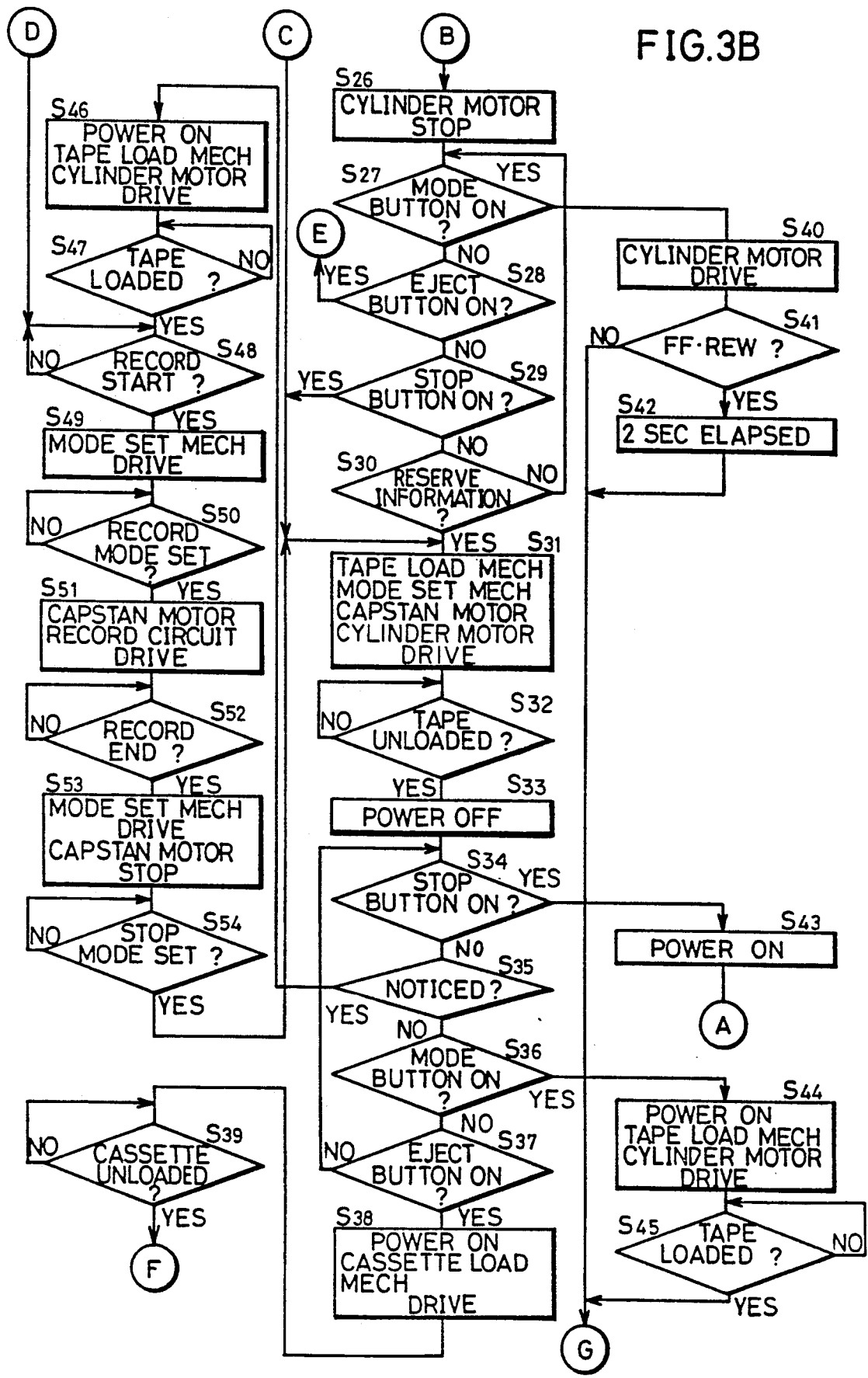

FIGS. 3A and 3B are flow charts for illustrating the operation of the first embodiment shown in FIG. 2.

In status (A) of FIG. 1, when the cassette-in sensor 2 senses at step S1 that the video cassette CA has been inserted into the cassette holder CH, the microcomputer 1 for system control actuates the power source circuit 10 while driving the loading motor driving circuit 12 at step S2. In status (A) of FIG. 1, the loading motor 15 driven by this loading motor driving circuit 12 is operatively connected with the cassette loading mechanism 18 and the mode setting mechanism 20, so that, when the cassette CA is inserted into the cassette holder CH, cassette loading is achieved to reach status (B).

The completion of the cassette loading is detected at step S3, by the mode detector 3 in operative association with the mode setting mechanism 20. In the meantime, on termination of the cassette loading, the loading motor 15 is disconnected from the cassette loading mechanism 18 and, instead, it is operatively connected with the tape loading mechanism 19. When the mode detector 3 detects the completion of the cassette loading at step S3, the microcomputer 1 instructs the cylinder motor driving circuit 13 to drive the cylinder motor 16 for driving the upper cylinder CY into rotation at step S4. The tape loading mechanism 19 is driven by the loading motor 15 to extract the tape by the tape guides TG intruded into the cassette CA to wind the tape about the rotating cylinder CY to perform tape loading at step S4. During this tape loading, the mode setting mechanism 20 applies a brake to the take-up reel base TM at step S4 so that the tape may be reeled out from the supplied reel SR by the tape guides TG.

When the completion of tape loading is detected by the mode detector 3 at step S5, the microcomputer 1 terminates the driving of the loading motor driving circuit 12. This causes the rotation of the loading motor 15 to be terminated so that status (C) of FIG. 1 is reached. In this state, the mode setting mechanism 20 releases the braking to the take-up reel base TM to apply a soft braking of a moderate braking power to the reel bases SM and TM. As a result, the VCR proceeds to the stop mode.

At this time, the cylinder motor 16 continues to be driven and the five-minute timer 1a starts the time counting for the five-minute stand-by period since the setting of the stop mode at step S6. The microcomputer 1 then proceeds to a first query cycle of repeatedly checking the possible presence of the time-up output of the five-minute timer 1a at step S7, the possible presence of the actuation of the stop button 4 at step S8, the possible presence of the advance notice output of the timer microcomputer 7 at step S9, the possible presence of the actuation of the mode buttons other than the stop button at step S10 and the possible presence of the actuation of the eject button at step S11.

Assuming that the eject button 6 is actuated at step S11, the loading motor driving circuit 12, the cylinder motor driving circuit 13 and the capstan motor driving circuit 14 are driven into operation at step S12 by the microcomputer 1. As a result, the loading motor 15 is reversed in its operation for shifting the tape loading mechanism 19 into the unloading direction, at the same time that the supply reel base SM is driven into rotation in operative association with the rotation of the capstan motor 17 for taking up the excess tape on the supply reel SR at step S12. In the meantime, during this tape unloading, the cylinder motor 16 is necessarily maintained in the driven state for preventing a possible injury to the tape.

When the execution of the tape unloading is detected by the mode detector 3 at step S13, the microcomputer 1 terminates the driving of the cylinder motor driving circuit 13 and the capstan motor driving circuit 14 at step S14. On completion of the above described tape unloading, the loading motor 15 is disconnected from the tape loading mechanism 19 and, instead, it is connected with the cassette loading mechanism 18 to perform the cassette unloading operation at step S14.

When the termination of the cassette unloading is detected by the mode detector 3 at step S15, the loading motor driving circuit 12 causes the driving of the loading motor 15 to be terminated, under the instructions of the microcomputer 1. When the actuation of the stop button 4 is subsequently detected at step S16, the power source circuit 10 is deactivated and the power source is turned off at step S17.

On the other hand, assuming that the group of mode buttons 5 is actuated in the course of the above described first query cycle at step S10, the loading motor driving circuit 12 is driven into operation in operative association with the actuated mode button, so that the mode setting mechanism 20 is driven into operation at step S18.

When the prescribed mode setting status is detected by the motor detector 3 at step S19, the microcomputer 1 causes the driving of the loading motor driving circuit 12 to be terminated, while activating the circuits associated with the set mode to execute the set mode at step S20. More specifically, the stop mode state and the fast forward and rewind mode state are in common with each other as the first status (C), so that, when the fast forward button or the rewind button is actuated in the stop mode, the mode setting mechanism 20 is not actuated, and only the capstan motor driving circuit 14 as the associative circuit is driven into operation, so that the take-up reel base TM or the supply reel base SM is driven at an elevated speed at step S20, depending on the rotational direction of the capstan motor 17. When the record button or the play button is actuated in the stop mode, the mode setting mechanism 20 causes the pinch roller PR to be pressured onto the capstan CP while abutting the tension pin TP on the tape at step S18. After this, the operation of the loading motor driving circuit 12 is terminated. In addition, the capstan motor driving circuit 14 and the record circuit 22 or reproduce circuit 23 are driven into operation at step S20 as the associated circuits.

In each of the modes set as described above, when other mode buttons are actuated at step S21, the loading motor driving circuit 12 is driven by the microcomputer 1, the reel blocks TM and SM are first braked and the mechanism 20 is set to the corresponding mode status at step S18. When the completion of mode setting is detected by the mode detector 3 at step S19, the microcomputer 1 terminates the driving of the loading motor driving circuit 12, activates the circuit pertinent to the set mode and executes the mode at step S20.

When the stop button 14 is actuated at step S23 during execution of each set mode, the driving of the capstan motor driving circuit 14 is terminated, the loading motor driving circuit 12 is driven into operation, the reel bases TM and SM are braked and the stop mode is set at step S24. When the setting of stop mode is detected by the mode detector 3 at step S25, the microcomputer 1 terminates the driving of the loading motor driving circuit 12 to return to the first query cycle to start the time counting of the five-minute timer 1a at step S6.

When the eject button 6 is actuated at step S22 during execution of each set mode, the reel bases TM and SM are braked. Then, as described hereinabove, the loading motor driving circuit 12, the cylinder motor driving circuit 13 and the capstan motor driving circuit 14 are driven at step S12 by the microcomputer 1. As a result, the tape guides TG are retracted by the tape loading mechanism 19, at the same time that, as the take-up reel base TM is braked by the mode setting mechanism 20, the excess tape is taken up on the supply reel SR, to effect tape unloading at step S12. When the completion of the tape unloading is detected at step S13 by the mode detector 3, the above described cassette unloading is executed at step S14.

In the above described first query cycle, when the time counting of five-minutes is terminated by the five-minute timer 1a and the time-up information is issued at step S7, driving of the cylinder motor driving circuit 13 is terminated at step S26 (FIG. 3B). After termination of the cylinder rotation, the microcomputer 1 proceeds to the second query cycle of repeatedly checking the possible presence of the operation of the mode button group 5 at step S27, the possible presence of the actuation of the eject button 6 at step S28, the possible presence of the actuation of the stop button 4 at step S29 and the possible presence of the reservation information at step S30.

During this second query cycle, when the stop button 4 is actuated at step S29 or the timer reservation output is produced by the timer microcomputer 7 at step S30, the power-off mode as later described is executed. On the other hand, when the eject button 6 is actuated at step S28, the above described eject operation is executed at steps S12 to S14 (FIG. 3A). When the mode button group 5 except the record button is actuated during this second query cycle at step S27, the cylinder motor driving circuit 13 is driven at step S40 and the same status is reached as that when the mode button group 5 is actuated during the above described first query cycle, except that, when the actuated mode operating button is the fast forward button or the rewind button at step S41, the capstan motor driving circuit 14 is driven into operation at step S20 (FIG. 3A) after a lapse of a waiting time of 2 seconds as the rise time of the cylinder rotation at step S42.

When the actuation of the stop button 4 is detected at step S8 and step S29 during the first or the second query cycle, or when the timer reservation output is produced during the second query cycle at step S30, the microcomputer 1 drives the loading motor driving circuit 12, cylinder motor driving circuit 13 and the capstan motor driving circuit 14 at step S31. This causes the driving of the tape loading mechanism 19 and the mode setting mechanism 20, as a result of which the tape is moved away from the rotating cylinder CY as the tape guides TG are moved. With the take-up reel base TM braked by the mode setting mechanism 20, the excess tape is taken up on the supply reel SR at step S31 by the supply reel base SM rotated in operative association with the rotation of the capstan motor 17.

When this tape unloading is detected by the mode detector 3 at step S32, the power source circuit 10, the loading motor driving circuit 12, the cylinder motor driving circuit 13 and the capstan motor driving circuit 14 are all rendered in non-operative at step S33. In this power-off state, the microcomputer 1 proceeds to the third query cycle of repeatedly checking the possible presence of the actuation of the stop button 4 at step S34, the possible presence of the advance notice output from the timer microcomputer 7 at step S35, the possible presence of the actuation of the mode buttons except the record button at step S36 and the possible presence of the actuation of the eject button at step S37.

When the stop button 4 is actuated at step S34 during this third query cycle, the power circuit 10 is activated at step S43, while the loading motor driving circuit 12 and the cylinder motor driving circuit 13 are driven at step S4 (FIG. 3A). As a result, tape loading is performed at step S5, and the time counting of the stand-by period of 5 minutes by the five-minute timer 1a is started at step S6 to start the first query cycle.

When the eject button 6 is actuated at step S37 during the above described third query cycle, the power source circuit 10 is activated, at the same time that the loading motor driving circuit 12 is driven to effect cassette unloading at step S38. When this eject mode is detected at step S39 by the mode detector 3, the microcomputer 1 automatically deactivates the power source circuit 10, so that the power-off state is reached at step S17 (FIG. 3A) to terminate the operation.

When the mode button except the record button is actuated during the third query cycle at step S36, the power source circuit 10 is first activated to turn on the power, while the loading motor driving circuit 12 and the cylinder motor driving circuit 13 are driven to effect tape loading at step S44. When the completion of the tape loading is detected at step S45 by the mode detector 3, the above described mode setting operation of steps S18 to S20 (FIG. 3a) is executed.

When the advance notice output is issued at step S35 by the timer microcomputer 7 during the third query cycle, the power source circuit 10 is activated to turn on the power, while the loading motor driving circuit 12 and the cylinder motor driving circuit 13 are driven to execute tape loading at step S46. When the tape loading is completed at step 47, the occurrence from the timer microcomputer 1 of the start output of the reserved record mode is awaited at step S48 in the stop mode. When the start output is issued, the loading motor driving circuit 12 is driven in response thereto, so that the mode setting mechanism 20 is driven at step S49. As a result, the tension pin TP is brought into abutment with the tape, while the pinch roller PR is brought into pressure contact with the capstan CP with the tape in-between.

When the completion of the setting of the record mode is detected at step S50, the capstan motor driving circuit 14 and the recording circuit 22 are driven to start the record mode at step S51. This record mode is continued until the occurrence of the termination output of the reserved record mode by the timer microcomputer 7. That is, when the termination output is issued at step S52 by the timer microcomputer 7, the microcomputer 1 terminates the driving of the capstan motor driving circuit 14, while instructing the loading motor driving circuit 12 to drive the mode setting mechanism 20 to brake the reel bases SM and TM to set the stop mode at step S53.

When the completion of the setting of the stop mode is detected at step S54, the above described tape unloading operation is performed continuously at step S31. On completion of the tape unloading at step S32, the power is turned off at step S33. The microcomputer 1 then proceeds to the above described third query cycle.

According to the first embodiment of the present invention, as described hereinabove, the cylinder rotation is performed for the period of the first 5 minutes during the stop mode following the termination of tape loading so that other modes can be set quickly during the stop mode without wasteful power consumption. After lapse of the stand-by period of 5 minutes, only the cylinder rotation is stopped, but the power source is not turned off, so that the tuner may be kept in the activated state and hence the state of monitoring of the channel selected at the VCR can be maintained.

FIG. 4 is a diagrammatic block view showing the arrangement for realizing the second embodiment of the present invention with the aid of a microcomputer. The feature of this second embodiment is that, when there is no necessity of maintaining the state of monitoring of the channel selected at the VCR after termination of the stand-by mode of 5 minutes, tape unloading is performed, while the power source circuit 10 is deactivated to realize the power-off state for further reducing the wasteful power consumption.

The embodiment shown in FIG. 4 is the same as that shown in FIG. 2 except the following points. That is, the operating output of the reservation button group 8 and the operating output of the channel select button group 21 are input directly into the system control microcomputer 1. A power source control circuit 1b is contained in the microcomputer 1 in addition to the five-minute timer 1a. More specifically, the five-minute timer 1a, which counts the stand-by period of 5 minutes since the setting of the stop mode to issue the time-up output, is reset responsive to the channel select operation occasionally performed during this time counting to restart the five-minute time counting. The five-minute timer 1a also counts the five-minute stand-by period to issue the time-up output when some operation is performed in the power-off state.

When the stop button is again actuated in the stop mode, the reservation output is issued by the timer microcomputer 7 as a result of termination of reservation, or when the time-up output is issued from the five-minute timer 1a, the power source control circuit 1b effects tape unloading, while realizing the power-off state. The power source control circuit 1b also realizes the power-on state when the mode button 5 other than the record button or the stop button 4 is actuated in the power-off state. The circuit 1b realizes the power-on state when the channel select button group 21 or the reservation button group 8 is actuated in the power-off state, and realizes the power-off state by the reservation output from the timer microcomputer 7 or the time-up output from the 5 minute timer 1a.

Figure 5B:
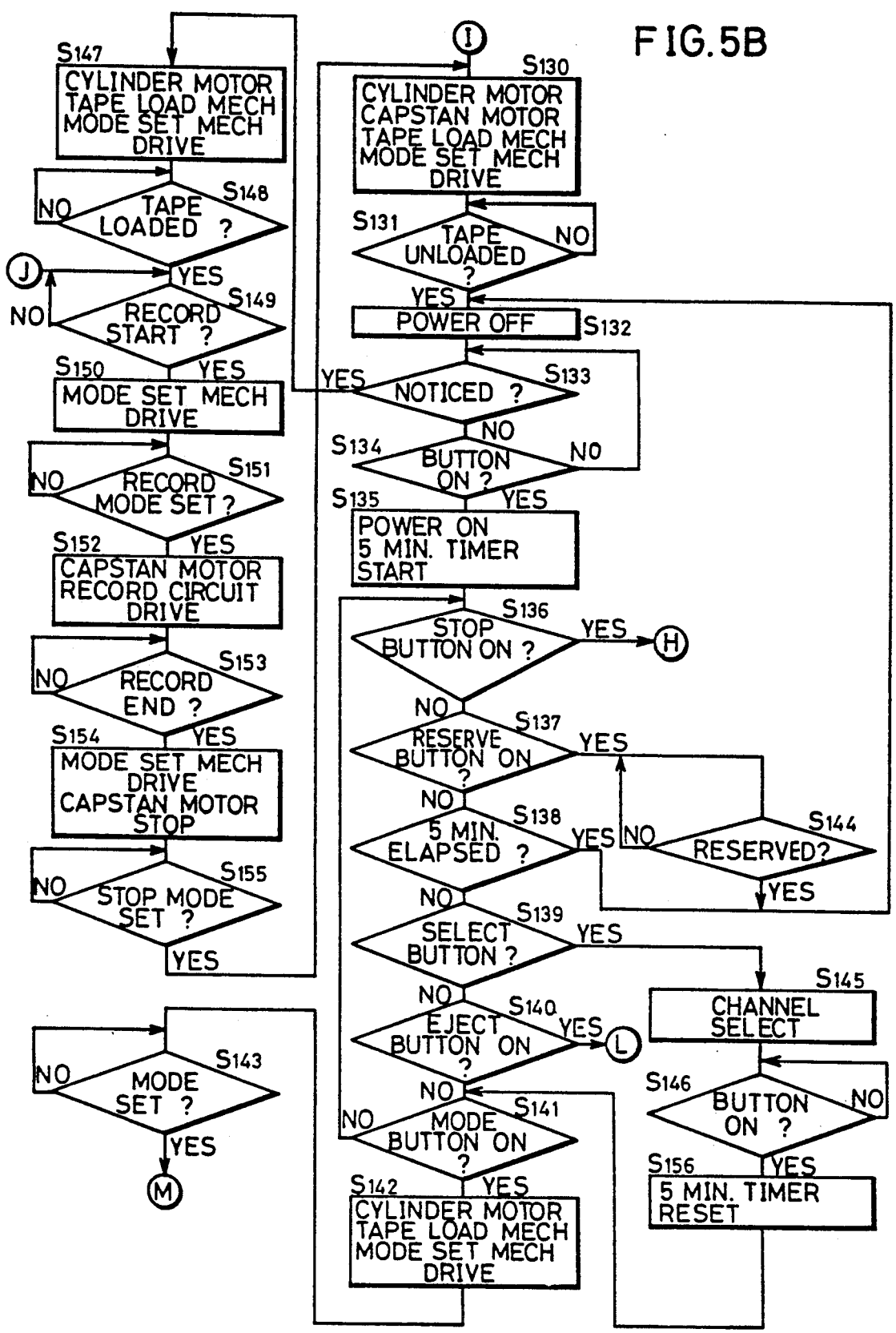

FIGS. 5A and 5B are flow charts for illustrating the operation of the second embodiment shown in FIG. 4. In this second embodiment, the operation since the insertion of the video cassette into the VCR until the setting of the stop mode at step S101 to step S106 is the same as the steps S1 to S6 of the first embodiment, so that the corresponding description is not repeated.

The first query cycle after setting of the stop mode at step S107 to step S113 in the present second embodiment differs from the first query cycle at steps S7 to S11 of the first embodiment in the following respects. First of all, the possible presence of the channel select operation is checked at step S108, and when the channel select operation has been performed, the five-minute timer 1a is reset and the first query cycle is executed from the outset at step S106. Secondly, when the time-up output is produced from the five-minute timer 1a at step S109, the tape unloading and the power-off operations are realized at steps S130 to S132 (FIG. 5B), in the same way as when the stop button is actuated. Thirdly, when the eject operation is performed at step S113, the power-off state is realized automatically after termination of the eject operation at step S118.

In FIGS. 5A and 5B, when the reservation button is actuated at step S107 and the reservation operation is terminated at step S119, tape unloading and power-off operations are realized at steps S130 to S132. However, this point is not illustrated in FIGS. 3A and 3B. It is understood that this operation is performed in the first embodiment as in the second embodiment. It is also shown in FIGS. 5A and 5B that, when the mode setting operation is performed during the first query cycle and the operation thus set is fast forward or rewind at step S121, the capstan motor is driven directly at step S124 without actuating the mode setting mechanism 20, and that, when a mode setting button is actuated at step S125 for changing the mode further in the set mode, the desired mode is set at step S120 after braking is once applied by the mode setting mechanism 20 to bases TM and SM. However, this point is not shown in FIGS. 3A or 3B. It is understood however that these operations are performed in common in the first and second embodiments.

The major feature of the second embodiment as compared with the above described first embodiment is that there lacks the mode of stopping the cylinder rotation in the stop state and the power-off state is reached immediately after termination of the cylinder operation, so that there lacks the query cycle corresponding to the second query cycle of the first embodiment.

In addition, in this second embodiment, when some button is actuated at step S134 during the third query cycle after the power is turned off at step S132, the power-on state is established to start the time counting of the five-minute timer 1a at step S135. After lapse of 5 minutes at step S138 or when the reservation button is actuated at step S137 and the reservation operation is terminated at step S144, the power is again turned off at step S132. Also when the channel select button is actuated at step S139 before the lapse of 5 minutes, and channel select operation is performed at step S145, the microcomputer 1 enters into awaiting state until some other button is actuated at step S146. Then, the five-minute timer 1a is reset at step S146. When some button is actuated, the microcomputer returns to the query cycle to check the possible presence of the actuation of the mode button at step S141.

The operation of the second embodiment is the same as that of the first embodiment except the points described hereinabove. According to the second embodiment, as described hereinabove, the power source is turned off at the same time that tape unloading is executed as the microcomputer leaves the stand-by mode, so that wasteful power consumption is reduced additionally.

It should be noticed that the above described first and second embodiments may also be made that the timer reservation information may be set before attachment of the cassette to the VCR. In this case, the arrangement is so made, although not shown in the flow charts of FIGS. 3A, 3B, 5A or 5B, when the erase prevention tab switch senses that, when the reservation output is issued from the timer microcomputer 7 before cassette attachment, the erase prevention tab of the inserted cassette is not broken, the microcomputer 1 realizes the power-off state at this time point to proceed to the third query cycle.

It should be noticed, in the above described first and second embodiments, no power source switch is provided, but the stop button 4 is actuated twice as described hereinabove to effect the turning on or off of the power source.

Also, in the above described first and second embodiments, reservation recording is performed after the power is turned on automatically in the power-off mode.

It should also be noticed that, in the above described first and second embodiments, although the five-minute timer starts since the setting of the stop mode, it may also be started in association with the start of operation of the tape loading mechanism, and that the time as set on the timer may be any time interval other 5 minutes.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A device for setting/releasing a stand-by mode for a video cassette recorder, said video cassette recorder including a cylinder provided with a magnetic head, rotating means for rotating said cylinder, signal recording/reproducing means connected to said magnetic head for recording/reproducing a signal from a tape stored in a video cassette, a cassette loading unit loading said video cassette into said video cassette recorder, a tape loading unit extracting tape from the loaded video cassette to achieve a tape loading state while driving said rotating means, direction/speed means for causing the tape in the tape loading state to feed in a specified direction and at a specified speed across said cylinder, reproducing mode responsive means for executing a reproducing mode, in which said signal is reproduced, in response to a designation of a reproduce mode by operation keys, said reproducing mode responsive means including a capstan, a pinch roller and a tension means for tensioning said tape, said reproducing mode responsive means pressuring said pinch roller toward said capstan and tensioning said tape to execute said reproducing mode, said device for setting/releasing the stand-by mode comprising:

tape loading executing means for executing loading of the tape by driving said tape loading unit in response to completion of loading of said video cassette by said cassette loading unit;

stand-by mode means for executing a stand-by mode, said stand-by mode means continuously drives said rotating means after said tape loading state is achieved;

stand-by releasing means for releasing said stand-by mode by terminating the driving of said rotating mean after a lapse of a first predetermined time period during the stand-by mode; and reactivating means for reactivating driving of said rotating means in response to selection of one of a fast forward operation and a rewind operation after said stand-by mode is released and then causing the tape in the tape loading state to feed in one of fast forward and rewind direction after a lapse of a second predetermined time period from selection of one of said first forward operation and said rewind operation.

2. A device for setting/releasing a stand-by mode for a video cassette recorder, said video cassette recorder including a power source means for providing power to said video cassette recorder, a cylinder provided with a magnetic head which picks up a signal, rotating means for rotating said cylinder, signal recording/reproducing means connected to said magnetic head for recording/reproducing said signal from a tape stored in a video cassette, a cassette loading unit loading said video cassette in said video cassette recorder, a tape loading/unloading unit extracting tape from the loaded video cassette to realize a tape loading state while driving said rotating means and said tape loading/unloading unit causing the tape to retract into the video cassette to realize a tape unloading state, direction/speed means for causing said tape, in the tape loading state, to feed in a specified direction and at a specified speed across said cylinder, reproducing mode responsive means for executing a reproducing mode in response to a designation of a reproducing mode by operational keys, said reproducing mode responsive means including a capstan, a pinch roller and a tensioning means for tensioning said tape, said reproducing mode responsive means pressuring the pinch roller to said capstan and tensioning said tape to execute the reproducing mode, said device for setting/releasing the stand-by mode comprising:

channel select means for selecting a desired one of a plurality of channels on said tape, said channel select means included in said signal recording/reproducing means;

tape loading executing means for executing loading of the tape by driving said tape loading/unloading unit in response to completion of loading of said video cassette by said cassette loading unit;

stand-by mode means for executing a stand-by mode, said stand-by mode means continuously driving said rotating means after said tape loading state is achieved; and stand-by releasing means for releasing said stand-by mode a) by driving said tape loading/unloading unit to execute a tape unloading after a lapse of a predetermined time period during said stand-by mode without operation of said operational keys and b) by turning off said power source means after completion of tape unloading, said stand-by releasing means including counting means for counting an elapsed time of said predetermined time period, and resetting means for resetting said counting means when said channel select means is actuated in the stand-by mode.

3. A device for setting/releasing a stand-by mode for a video cassette recorder, said video cassette recorder including power source means for providing power to said video cassette recorder, a cylinder provided with a magnetic head which picks up a signal, rotating means for rotating said cylinder, signal recording/reproducing means connected to said magnetic head for recording-/reproducing said signal from a tape stored in a video cassette, a cassette loading unit loading said video cassette in said video cassette recorder, a tape loading/unloading unit extracting tape from the loaded video cassette to realize a tape loading state while driving said rotating means and said tape loading/unloading unit causing the tape to retreat into the video cassette to realize a tape unloading state, direction/speed means for causing said tape, in the tape loading state, to feed in a specified direction and at a specified speed across said cylinder, reproducing mode responsive means for executing a reproduce mode in response to a designation of a reproducing mode by operational keys, said reproducing mode responsive means including a capstan, a pinch roller and a tensioning means for tensioning said tape, said reproducing mode responsive means pressuring the pinch roller to said capstan and tensioning said tape to execute the reproduce mode, stop mode designating means for designating a stop mode, said device for setting/releasing said stand-by mode comprising:

tape loading executing means for executing loading of the tape by driving said tape loading/unloading unit in response to completion of loading of said video cassette by said cassette loading unit;

stand-by mode means for executing a stand-by mode, said stand-by mode means continuously driving said rotating means after said tape loading state is achieved;

first stand-by releasing means for releasing said stand-by mode a) by driving said tape loading/unloading unit to execute tape unloading when the stop mode is designated by the stop mode designating means during said stand-by mode and b) by turning off said power source means after completion of tape unloading;

power on means for turning on said power source means when said stop mode designating means is reactivated after said first stand-by releasing means releases said stand-by mode, wherein after said power source means is reactivated, said tape loading/unloading unit driven to a tape loading state and returned to said stand-by mode where said rotating means is continuously driven; and second stand-by releasing means for releasing said stand-by mode c) by driving said tape loading/unloading unit to execute tape unloading after a lapse of a predetermined time period during the stand-by mode and d) by turning off said power source means after completion of said tape unloading.

4. A video cassette recorder provided with a function of setting/releasing a stand-by mode, comprising:

a cylinder provided with a magnetic head which picks up a signal;

rotating means for rotating said cylinder;

a signal recording/reproducing means, connected to said magnetic head, for recording/reproducing said signal from a tape stored in a video cassette;

a cassette loading unit loading said video cassette in said video cassette recorder;

a tape loading unit extracting tape from the loaded video cassette to realize a tape loading state while driving said rotating means;

tape loading executing means for executing tape loading by driving said tape loading unit in response to completion of loading of said video cassette by said cassette loading unit;

stand-by mode means for executing a stand-by mode, said stand-by mode means continuously driving said rotating means after said tape loading state is completed;

stand-by releasing means for releasing said stand-by mode by stopping the driving of said rotating means after a lapse of a first predetermined time period in said stand-by mode;

reactivating means for reactivating driving of said rotating means in response to selection of one of a fast forward mode or a rewind mode after said stand-by mode is released and then causing the tape in the tape loading state to feed in a specified direction after a lapse of a second predetermined time period after selection of one of said fast forward mode or said rewind mode;

direction/speed means for causing the tape in said tape loading state to feed in said specified direction and at a specified speed across said cylinder; and reproducing mode responsive means for executing a reproduce mode in response to a designation of a reproducing mode by operational keys, said reproducing mode responsive means including a capstan, a pinch roller and a tensioning means for tensioning said tape, said reproducing mode responsive means pressuring said pinch roller to said capstan and tensioning said tape to execute the reproduce mode.

5. A video cassette recorder provided with a function of setting/releasing a stand-by mode, comprising:

power source means for providing power to said video cassette recorder;

a cylinder provided with a magnetic head which picks up a signal;

rotating means for rotating said cylinder;

signal recording/reproducing means, connected to said magnetic head, for recording/reproducing said signal from a tape stored in a video cassette, said signal recording/reproducing means including channel select means for selecting a desired one of a plurality of channels on said tape;

a cassette loading unit loading said video cassette in said video cassette recorder;

a tape loading/unloading unit extracting tape from the loaded video cassette to realize a tape loading state while driving said rotating means and said tape loading/unloading unit causing the tape to retreat into the video cassette to realize a tape unloading state;

tape loading executing means for executing loading of said tape by driving said tape loading/unloading unit in response to completion of loading of said video cassette by said cassette loading unit;

stand-by mode means for executing a stand-by mode, said stand-by mode means continuously driving said rotating means after said tape loading state is completed;

stand-by releasing means for releasing said stand-by mode by driving said tape loading/unloading unit to execute tape unloading after a lapse of a predetermined time period in said stand-by mode without operation of operational keys and by turning off said power source means after completion of tape unloading, said stand-by releasing means including counting means for counting said predetermined time period, and resetting means for resetting said counting means when said channel select means is activated in said stand-by mode;

direction/speed means for causing said tape in the tape loading state to feed in a specified direction and at a specified speed across said cylinder; and reproducing mode responsive means for executing a reproducing mode in response to a designation of a reproducing mode by said operational keys, said reproducing mode responsive means including a capstan, a pinch roller and a tensioning means for tensioning said tape, said reproducing mode responsive means pressuring said pinch roller to said capstan and tensioning said tape to execute the reproduce mode.

6. A video cassette recorder provided with a function of setting/releasing a stand-by mode, comprising:

power source means for providing power to said video cassette recorder;

a cylinder provided with a magnetic head which picks up a signal;

rotating means for rotating said cylinder;

signal recording/reproducing means, connected to said magnetic head, for recording/reproducing said signal from a tape stored in a video cassette;

a cassette loading unit loading said video cassette in said video cassette recorder;

a tape loading/unloading unit extracting tape from the loaded video cassette to realize a tape loading state while driving said rotating means and said tape loading/unloading unit causing the tape to retract into the video cassette to realize a tape unloading state;

tape loading executing means for executing loading of said tape by driving said tape loading/unloading unit in response to completion of loading of said video cassette by said cassette loading unit;

stand-by mode means for executing a stand-by mode, said stand-by mode means continuously driving said rotating means after said tape loading state is completed;

first stand-by releasing means for releasing said stand-by mode a) by executing said tape unloading when the stop mode is designated by a stop mode designating means during the stand-by mode and b) by turning off said power source means after completion of tape unloading;

power on means for turning on said power source means when said stop mode designating means is reactuated after said first stand-by releasing means releases said stand-by mode, wherein after said power source means is reactivated, said tape loading/unloading means driven to a tape loading state and restored to said stand-by mode;

second stand-by releasing means for releasing said stand-by mode c) by driving said tape loading/unloading unit to execute tape unloading after a lapse of a predetermined time period in said stand-by mode and d) by turning off said power source means after completion of said tape unloading;

direction/speed means for causing the tape in said tape loading state to feed in a specified direction and at a specified speed across said cylinder; and reproducing mode responsive means for executing a reproducing mode in response to a designation of a reproducing mode by operational keys, said reproducing mode responsive means including a capstan, a pinch roller and a tensioning means for tensioning said tape, said reproducing mode responsive means pressuring said pinch roller to said capstan and tensioning said tape to execute the reproducing mode.

* * * * *